US005512031A

United States Patent [19]

Ziems et al.

[11] Patent Number: 5,512,031

[45] Date of Patent: Apr. 30, 1996

[54] METHOD OF CENTRIFUGAL SEPARATION WITH LOAD SENSING CIRCUIT FOR OPTIMIZING CLEANING CYCLE FREQUENCY

[75] Inventors: Tom S. Ziems, Perrysburg; Mark H. Opfer, Pemberville, both of Ohio

[73] Assignee: Glassline Corporation, Perrysburg, Ohio

[21] Appl. No.: 440,530

[22] Filed: May 12, 1995

Related U.S. Application Data

[62] Division of Ser. No. 321,819, Oct. 5, 1994, Pat. No. 5,454,777.

[51] Int. Cl.[6] .......... B01D 43/00

[52] U.S. Cl. .......... 494/37

[58] Field of Search .......... 494/1, 7, 8, 9, 494/10, 11, 37, 58, 59, 84, 56; 210/103, 145, 147, 143, 372, 374, 739, 781, 784, 787, 380.1

[56] References Cited

U.S. PATENT DOCUMENTS

| | | | |
|---|---|---|---|
| 2,731,151 | 1/1956 | Hopper | 210/145 |
| 2,761,564 | 9/1956 | Tholl et al. | 210/372 X |
| 2,878,943 | 3/1959 | Ziherl | 210/374 |
| 2,906,466 | 9/1959 | Hopper | 210/145 X |
| 3,044,625 | 7/1962 | Smith et al. | 210/97 X |
| 3,403,848 | 10/1968 | Windsor et al. | 494/11 |
| 3,559,808 | 2/1971 | O'Conor | 494/7 X |
| 3,851,819 | 12/1974 | Tadokoro | 494/84 X |
| 4,223,829 | 9/1980 | Bange | 494/9 |
| 4,229,298 | 10/1980 | Bange | 210/787 |
| 4,522,620 | 6/1985 | Leister | 494/10 |
| 4,773,992 | 9/1988 | Dietrick et al. . | |
| 4,941,868 | 7/1990 | Chulay et al. . | |
| 4,952,127 | 8/1990 | Schmeisser et al. . | |
| 5,093,008 | 3/1992 | Clifford, III . | |
| 5,095,451 | 3/1992 | Allen . | |
| 5,250,180 | 10/1993 | Chang | 210/374 X |
| 5,253,529 | 10/1993 | Lenormand et al. . | |

FOREIGN PATENT DOCUMENTS

| | | | |
|---|---|---|---|
| 593103 | 11/1977 | Switzerland | 494/11 |
| 420347 | 3/1974 | U.S.S.R. | 494/58 |

OTHER PUBLICATIONS

Sanborn Soli Pac Separators Brochure, Solids Removing Centrifuges for Glass Processing Applications, 4 pages.

*Primary Examiner*—Charles E. Cooley
*Attorney, Agent, or Firm*—Emch, Schaffer, Schaub & Porcello Co.

[57] ABSTRACT

A method for enhancing the efficiency of a centrifugal separator which automatically adjusts in accordance with operator input for varying amounts of solids in contaminated fluid being passed through the separator. A load sensing circuit monitors the load on the drive motor of the centrifuge bowl and a second load sensing circuit monitors the load on the drive motor of the scraper vane. The method makes use of a variable speed motor designed to vary the gravitational force with which the centrifuge operates in response to a variety of factors regarding particle size and specific gravity. The load sensing circuits optimize cleaning cycle frequency and reduce failure due to mechanical stress, The load sensing circuits taken in combination with the variable speed drive provide the ability to efficiently and variably monitor the cleansing intervals to provide predetermined levels of cleansing and prevent the overloading of the scraper and scraper mechanics.

4 Claims, 2 Drawing Sheets

METHOD OF CENTRIFUGAL SEPARATION WITH LOAD SENSING CIRCUIT FOR OPTIMIZING CLEANING CYCLE FREQUENCY

This is a divisional of application Ser. No. 08/321,819 filed on Oct. 5, 1994, now U.S. Pat. No. 5,454,777.

BACKGROUND OF THE INVENTION

The present invention relates to a Centrifugal separation device and method of separating solids or swarf from contaminated effluent such as oil base coolants and other liquids which are used in a variety of grinding and machining applications in the glass, ceramic and metal-forming industries. In a centrifugal separator, the separation of swarf from the liquid is commonly accomplished by pumping the contaminated coolant or liquid into a high speed rotating chamber or bowl. The centrifugal gravitational forces created by the high speed rotation of the chamber cause the contaminated fluid to conform to the interior outside vertical surface of the rotating chamber. Since The chamber is rotating at a high speed, the solid material is forced to adhere to the side of the bowl or chamber while the cleansed coolant or liquid exits through openings commonly located at the bottom of the bowl to be drained away through an outlet pipe. Such centrifugal separators provide a rugged, simple and cost effective way to maintain the clean fluid necessary for consistent product quality and long tool life in the glass, ceramic and metal-forming industries. Centrifugal separators are commonly capable of recovering up to 95% of reusable fluid and provide a discharge of solids that is relatively moisture free.

It is axiomatic that the efficiency of a centrifugal separator decreases as increasing amounts of solid material build up on the sides of the separator. Therefore, the separator must be periodically stopped to remove the solid cake material or swarf. Separators have been provided which capture the solids on a removable liner which can be easily removed, cleansed and replaced by an operator. Automatic cleansing systems have been provided wherein scraper blades mounted inside the rotating bowl are activated to automatically scrape or plow the solids from the side of the bowl and expel them into a sludge container mounted below the unit. Commonly, the cleansing cycle is provided at timed intervals which are usually determined by an operator based upon experience. Problems have been encountered with timed cleansing operations due to the potential for variations to occur in the amounts of solids which might flow through the separator between cleansing intervals. If varying amounts of solids build up on the interior of the separator, it is difficult to ensure that the separator will not become overloaded or inefficient. An excess of removable solids between the timed cleansing intervals can result in the following deficiencies in the removal system: inefficient solid separation; overloading or premature failure of the bowl drive motor and mechanics; and overloading or premature failure of the scraper drive motor and mechanics.

An example of such commonly encountered difficulties is presented by viewing the differences between metal and glass particles. Glass particles, having a specific gravity of approximately 2.2 to 2.6, are minimal in weight as compared to metal particles which have a specific gravity of 8 to 9. Thus, the load build-up of glass on the inner wall of the rotating bowl is slower than the load build-up of metal, when the solid to liquid ratios are the same. However, glass particles, upon becoming dehydrated, have a tendency to adhere to one another and to the inner wall of the rotating bowl making the glass difficult to remove in the scraping process. As a result, even though glass has a lower specific gravity, it is often the case that the load sensing and scraping cycle for glass must be done at more frequent intervals.

Attempts to provide for and ensure the efficient operation of such centrifuge separator units are evidenced by the following patents. U.S. Pat. No. 4,522,620 discloses a method and apparatus for measuring the quantity of solid material in a centrifuge cylinder using a mechanical vibration system which senses the quantity of solids. A supplemental mass is attached to the cylinder to produce proportional vibrations by increasing or decreasing the speed of the cylinder drive shaft. A sensor measures the frequency of the vibrations and sends signals to a controller which calculates the quantity of the load of solid material from the vibrational frequencies. U.S. Pat. No. 4,773,992 discloses a centrifuge system for removing impurities from metal working coolant having a timing means to signal the discharge of the solids. U.S. Pat. No. 4,952,127 discloses a method and apparatus for separating high molecular weight substances from fluid culture medium wherein an optical sensor is used to monitor the solid content of the centrifuge. U.S. Pat. No. 5,095,451 discloses a centrifuge particle size analyzer which creates measurements by means of a radiation source such as an x-ray as a function of intensity, time and radial position to determine the distribution and particle size of solids within the centrifuge. U.S. Pat. No. 5,253,529 discloses a system for measuring constituents of a centrifuged medium using a mechanical signal such as a sound wave.

The prior art thus described teaches a variety of complex methods and apparatus for sensing the quantity and particle size of solids retained in a centrifuge. Such designs, for many varied reasons, are often undesirable for centrifugal separators intended for heavy, rugged field use. Thus, the present invention meets a demand for a rugged, low maintenance centrifuge having a simple, cost effective way to maintain the clean fluid necessary to achieve consistent product quality and long tool life for glass, ceramic and metal-forming applications.

SUMMARY OF THE INVENTION

The present invention provides an apparatus and method for enhancing the operation of a centrifugal separator and automatically adjusting for varying amounts of solids in contaminated fluid being passed through the separator. The present invention includes a load sensing circuit which monitors the load on the drive motor of the separator centrifuge bowl and signals for a cleaning cycle based upon the load information. The intervals between the cleaning cycles are automatically varied depending upon the amount of specified solids in the fluid being passed through the separator and the load on the drive motor produced by the solids. The intervals between the cleaning cycles may not vary at all if the amount of solids passing through the separator remains somewhat constant. The present invention provides for more efficient cleansing of fluids due to the more efficient operation of the centrifuge. Further, the load sensing device of the present invention provides the ability to optimize the frequency of cleaning cycles, thereby potentially allowing the centrifuge to remain in operation for longer periods of time. The present invention further provides a load sensing device positioned to monitor the solid material scraper which enables the scraper to operate in a manner which reduces the amount of stress on the scraper blade, the blade spindle, the gear transmission and the drive motor. Thus, the potential for frequent mechanical failure due to overstressed parts, as well as premature scraper motor burnout is reduced. The present invention also provides a variable speed drive motor for the centrifuge bowl which provides the capability of altering the gravity forces within the centrifuge in response to the individual specific gravity of a variety of suspended solid materials. For example, the specific gravity of glass ranges between one and three, whereas the specific gravity of carbide is eight. Thus, glass will require a higher centrifugal gravity force to settle out quickly than will carbide. The variable speed drive provides the ability to provide the variations in the gravity force. Further, dependent upon a variety of factors and particle size, increasing the centrifugal gravity force will provide the capability of removing finer, smaller particles of the same specific gravity as a larger particle already being removed quickly. For example, in glass particle removal, a high majority of all particles down to five microns can be removed at a gravity force of 1,000 BGS (British Gravitational System). However, to remove a majority of particles down to a one micron size would require a gravity force of 1,200 BGS. Therefore, the use of a variable speed drive provides the ability to process a particular liquid at a lower gravity force and a higher flow of effluent for a given period of time and then increase the gravity force and reduce the effluent flow to create greater residence time and a much higher reduction in the fine particles. Thus, the load sensing device taken in combination with the variable speed drive for the centrifuge of the present invention provides the ability to efficiently and variably monitor the cleansing intervals to provide predetermined levels of cleansing and prevent the overloading of the scraper and scraper mechanics.

It is the object of the present invention to provide an improved centrifugal swarf separator capable of varying the solid cleansing intervals to maintain peak efficiency in the cleansing of effluent being passed through the separator.

Another object of the present invention is to provide a simple load sensing device for controlling and monitoring the amount of solids accumulated on the side walls of the centrifuge.

Yet another object of the present invention is the provision of a load sensing device on the scraper mechanism to monitor solid material quantity and assist in preventing damage to the scraper mechanical and electrical components.

Yet another object of the present invention is to provide a variable speed drive for the centrifuge to accommodate the differing specific gravities of solid material and the removal of material in a variety of sizes.

These objects and others are met by the present invention which is more fully described in the following detailed description of the preferred embodiment with reference to the accompanying drawings.

IN THE DRAWINGS

DETAILED DESCRIPTION OF THE PREFERRED EMBODIMENT

Figure 1:
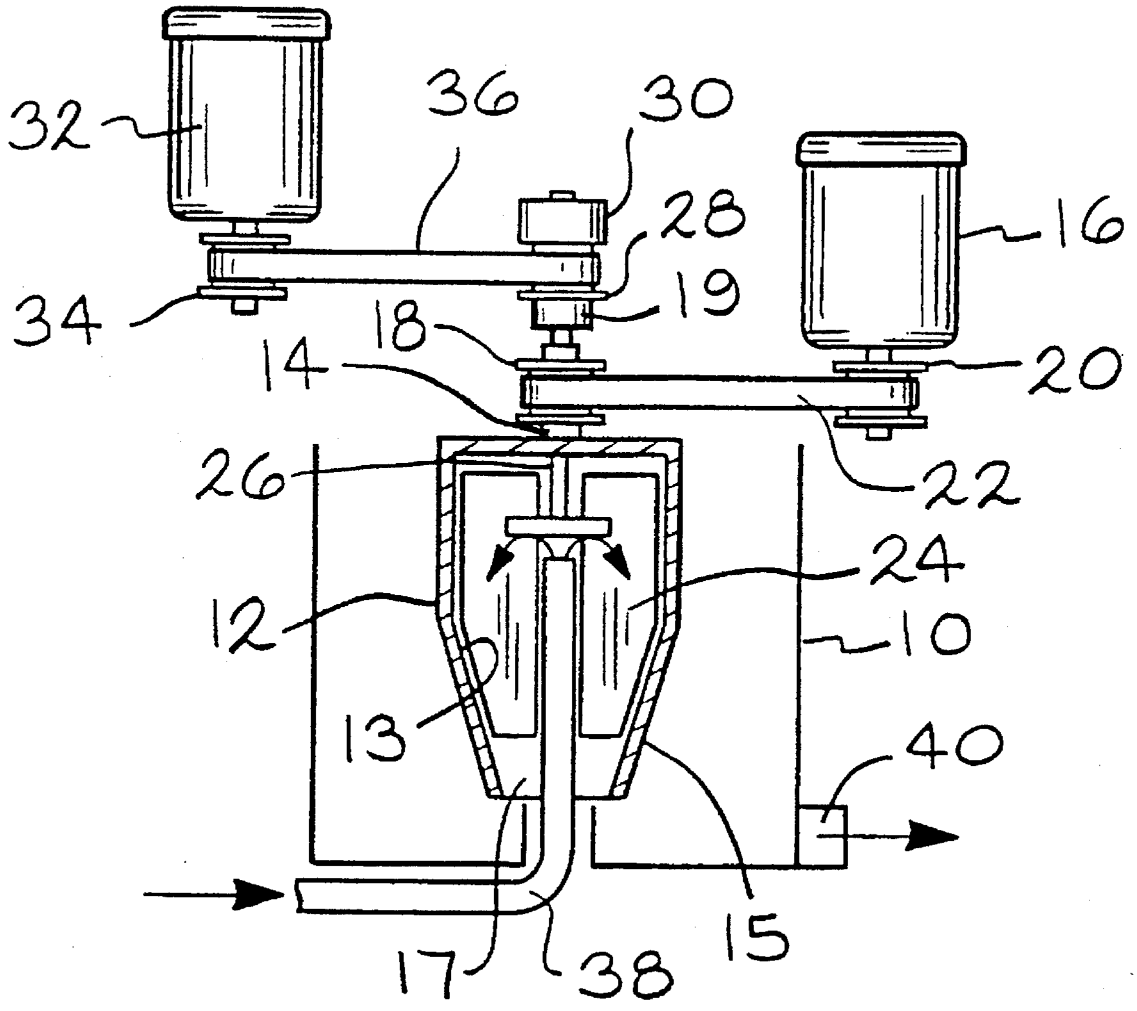
FIG. 1 is a schematic diagram of the centrifugal separator incorporating the present invention.

Referring to FIG. 1, the centrifugal separator of the present invention is shown having a cabinet 10 which encloses a centrifugal bowl or rotor 12 mounted on a centerline shaft 14. The shaft 14 is engaged with a drive motor 16, preferably through pulleys 18, 20 located on the shaft 14 and drive motor 16 respectively. A belt 22 interconnects the shaft pulley 18 with the motor pulley 20. Preferably, the centrifugal bowl 12 defines a shape that is cylindrical for approximately two-thirds of its length and conical for the remaining one-third of length. The conical portion 15 narrows to create an opening 17 at the bottom of the bowl 12 that is generally one-half the diameter of the cylindrical portion of the bowl 12. Cleansed fluid will be expelled through the opening 17 into the fluid outlet line 40 during the centrifuge operation and dehydrated solids are removed through the opening 17 during the cleaning of the centrifuge. The shaft 14 is fixed within a bearing cartridge (not shown) affixed to the housing 10. The shaft 14 is hollow along its full length about its centerline and includes a boxed bearing housing 19 positioned above the shaft pulley 18.

Provided within the centrifuge bowl 12 is a scraper 24 having at least two blades or vanes which extend radially and axially within the bowl 12 to provide a precision fit with only a slight clearance or gap with the interior wall 13 of the bowl 12. The blades 24 are fixed to a scraper shaft 26 which extends through the boxed bearing housing 19 and the hollow shaft 14 into the interior of the bowl 12. The scraper 24 and its shaft 26 are preferably driven to rotation by a gear motor 32 having an attached sprocket 34 which is engaged by means of a chain 36 with a sprocket 28 and clutch 30 which are mounted on the scraper shaft 26. While the centrifuge bowl 12 is in operation, the clutch 30 which is preferably an air clutch is disengaged, thereby allowing the scraper 24 to rotate freely with the bowl 12. If the bowl 12 has accumulated sufficient solids to necessitate a cleansing, the bowl 12 is locked in position by a rotor lock assembly (not shown) and the clutch 30 and motor 32 are engaged to drive the scraper 24 about the interior wall 13 of the bowl 12 to break the dehydrated solids accumulated on the wall 13 away from the wall. Usually, the solid material then drops through the opening 17 located at the bottom of the bowl 12 into a solid material collection bin (not shown).

Finally, the separator of the present invention includes an effluent inlet line 38 which provides contaminated fluid to the interior of the centrifugal separator 12 and a fluid outlet line 40 which removes the cleansed fluid flowing from the centrifugal separator.

Figure 2:
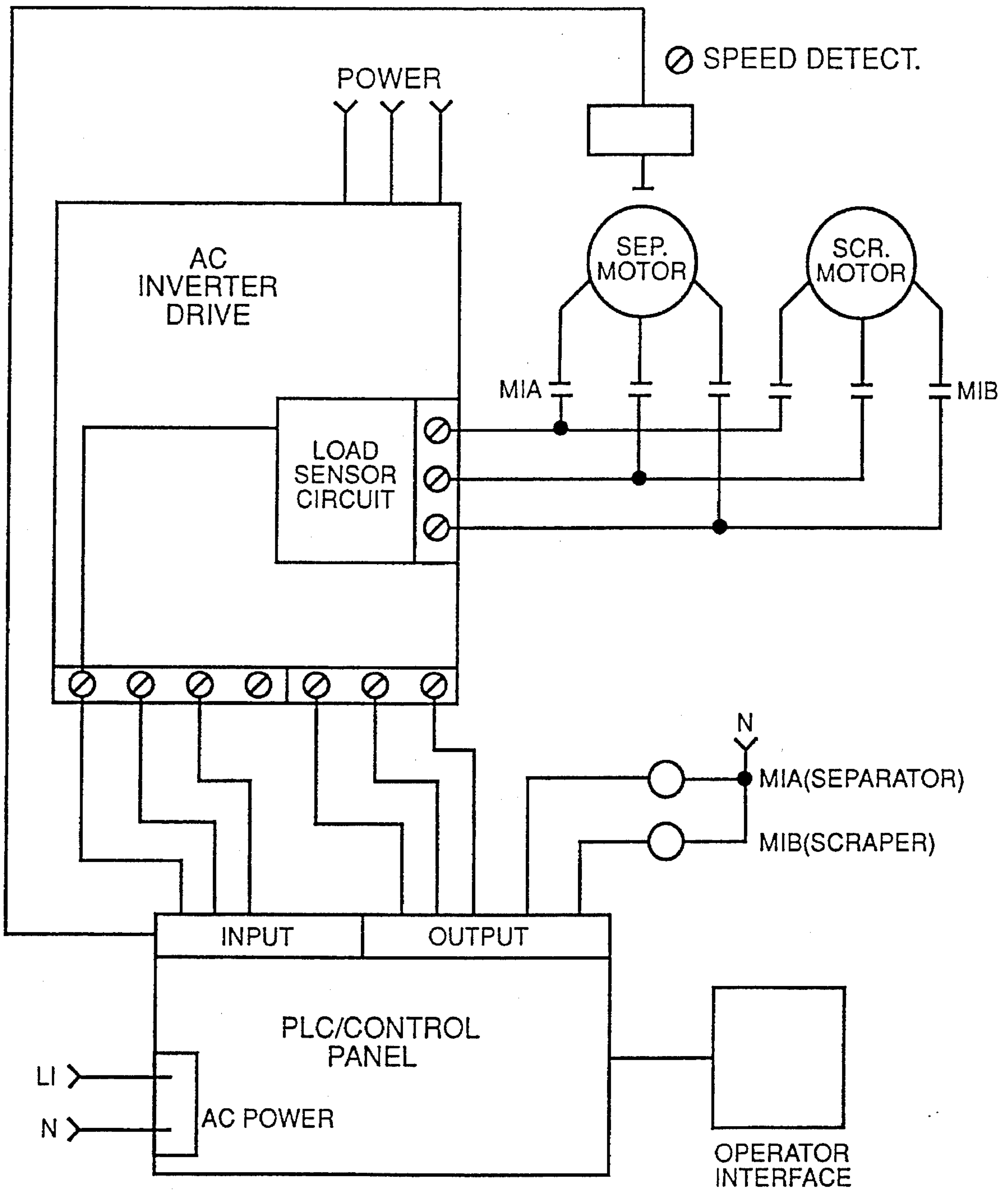
FIG. 2 is a block circuit diagram for the speed and torque monitors for the separator and scraper motors.

Referring now to FIG. 2, the electrical circuit for the speed and torque monitor for the separator motor 16 and the scraper drive motor 32 is shown as a block diagram. A programmable logic controller (PLC) receives input from the operator regarding the torque limit requirements for each motor. During a normal operative cycle, the PLC will send an enable signal to the AC inverter drive which in turn activates output MIA to provide power to the separator or rotor motor 16 to begin the filtration process. During the filtration process, the load sensing circuit, which is located on the inverter drive board, will continually monitor the current applied to the separator drive motor 16 and send signals to the PLC to compare with speed of rotation signals received by the PLC from a speed detection monitor located proximate the separator rotor 12. Thus, the torque or load on the drive motor 16 is measured by the PLC and compared with the limits which have been preset in the PLC by the operator. When the PLC senses that the load on the drive motor 16 is surpassing its preset limits, the MIA Output is disabled to deactivate the drive motor 16. Once the separator 12 stops rotating, as detected by the speed detector, the PLC will activate the output MIB and enable the scraper motor 32. As the scraper motor 32 activates the scraper vane 24, the load sensor circuit will continually monitor the current draw or load on the scraper motor 32 and send signals to the PLC for comparison with the preset limits. If the predetermined current draw is met or surpassed, the PLC will signal the inverter drive to reverse polarity and, thereby, reverse the direction of rotation of the scraper motor 32. As is to be further explained, the scraper motor will continue this agitation motion until it either freely rotates within the rotor 12 for a designated period of time or fails to dislodge the accumulated solids after a designated period of time, at which time the apparatus is either directed to repeat the operation sequence or shut down.

Preferably, the drive motor 16 for the centrifuge rotor is a variable speed motor capable of operating the centrifuge in a range of 2,000 rpm to 3,000 rpm. The variability of speed is necessitated for efficient cleansing as a result of variations in treatable particle size, particle specific gravity, degree of dehydration of collected solids and the solid/liquid ratio. The variable speed for the drive motor 16 assists in sensing the torque/current load of the rotor bowl 12 which is used to initiate the cleaning or scraping cycle. The variable speed motor 16 will accelerate the centrifuge rotor 12 to its running speed over a timed interval, thus allowing for a smaller horsepower drive motor to be utilized. To insure that all liquid is drained from the rotor 12, the variable speed drive motor 12 will ramp down or decelerate the centrifuge bowl over a timed interval in order to properly drain liquid remaining in the rotor 12 to the clean tank as it exits the opening 17 of the bowl through the outlet line 40. If the rotor 12 is stopped too quickly, it has been experienced that the liquid will drain to the solid material disposal container.

During operation of the centrifuge of the present invention, the load on the drive motor 16 is sensed by the load sensor circuit to indicate the build-up of solids within the rotor bowl 12. The PLC is programmed to sample the load on the rotor bowl 12 at timed intervals. As the intervals time out, the drive motor 16 is decelerated to a lower rpm by the PLC and inverter drive, for example, from 60 Hz to 50 Hz. The drive motor 16 is stabilized for a short time period at the slower running speed and then accelerated back to its normal running speed. During the acceleration, which takes approximately five seconds, the torque and current required for the acceleration are monitored and displayed by the PLC. The values are preferably shown in percentage of capacity of the motor drive (i.e. 80%), As solids build up in the bowl 12, the percentages will raise slightly due to the force required to accelerate the heavier mass. The programmable controller is preset by the operator with an upper limit on the torque or current required to accelerate the drive motor 16, rotor 12 and particle mass which is established as the point at which a cleaning cycle is initiated (i.e. 85% of the capacity of the motor drive). Since the percentage values of the torque/current limits are entered into the programmable controller, the controller will monitor the inputs received from the load sensor and when the percentage values are met or exceeded, the cleaning cycle is initiated. The programmable controller can also be programed to override the load sensor, should the centrifuge 12 run for an extended period of time with an insufficient solid buildup to create a cleaning cycle initiated by the load sensor. The controller is programmed with, a preset time interval which will initiate the cleaning cycle to prevent potential difficulty in scraping the solids which may have been excessively dehydrated and tend to adhere firmly to the rotor 12 and wall 13. Thus, the provision of a load sensor and the programmable controller creates the desired variability in the cleaning cycle initiation; either by sensing the load and mass of material accumulated on the wall 13 of the centrifuge 12 or by timed intervals which prevent accumulation of extremely dehydrated solid which may cause difficult scraping and cleaning operations.

The load limits for the scraper motor 32 can be set in much the same manner as has been described for the rotor motor 16. The torque and current usage is continually received by the controller through the load sensor during the scraping cycle. The scraping cycle is initiated by the controller in the following manner. The bowl will be decelerated and stopped and held firmly in place by a cylinder operated rotor lock assembly (not shown). When the lock has been engaged, the scraper motor 32 and air clutch 30 are actuated to begin the scraping operations. The scraper motor 32 and the scraper blades 24 will continually reverse their direction of movement according to direction from the programmable controller to cause an oscillating motion which aids in breaking the solids loose from the bowl until the cleaning cycle is completed. The controller is also preferably programmed to provide a timed interval, wherein if the solids have not been loosened or removed, the centrifuge will be shut down to prevent possible damage to the components of the centrifuge and scraper blades.

The above description of the preferred embodiment of the invention is intended to be illustrative in nature and not necessarily limiting upon the scope of the following claims.

We claim:

1. A method for removing entrained solids from a contaminated effluent comprising the steps of:

(a) rotating a centrifuge bowl with a drive motor at a speed designed to produce high gravitational centrifugal forces within the bowl;

(b) introducing a flow of fluid entrained with solid particulate to the interior of the bowl;

(c) monitoring the load on the drive motor and producing signals relative to the drive motor load as the bowl rotates to accumulate the solid particulate;

(d) controlling the operation of the drive motor in response to the signals so as to discontinue rotation of the bowl when the drive motor load exceeds a predetermined level; and (e) removing the accumulated solid particulate from the interior of the centrifuge bowl.

2. The method of claim 1, wherein the monitoring and controlling steps include:

(a) measuring the amperage required to operate the drive motor;

(b) establishing preset amperage limits for the drive motor; and (c) discontinuing rotation of the centrifuge bowl when the amperage required to operate the drive motor exceeds the preset amperage limits.

3. The method of claim 1, wherein the solid particulate removal step includes:

(a) rotating a scraper member with a second drive motor to scrape the solids particles from the centrifuge bowl;

(b) monitoring the load on the second drive motor and producing signals relative to the load on the second drive motor; and (c) controlling the operation of the second drive motor in response to the signals relative to the load on the second drive motor.

4. The method of claim 3, wherein the monitoring and controlling steps further include:

(a) measuring the amperage required to operate the second drive motor;

(b) establishing preset amperage limits for the second drive motor; and (c) reversing the rotation of the scraper member when the amperage required to operate the second drive motor exceeds the preset amperage limits.

* * * * *